(12) United States Patent
Shin et al.

(10) Patent No.: US 8,425,104 B2
(45) Date of Patent: Apr. 23, 2013

(54) BACKLIGHT ASSEMBLY AND DISPLAY APPARATUS HAVING THE SAME

(75) Inventors: Taek-Sun Shin, Asan-si (KR);
Seunghwan Chung, Asan-si (KR);
Seungin Baek, Seoul (KR); Jaejoong Kwon, Suwon-si (KR); Young-Min Park, Seoul (KR); Dong-Yeol Yeom, Cheonan-si (KR); Kwang-Wook Choi, Cheonan-si (KR); Rae-Young Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 357 days.

(21) Appl. No.: 12/782,210

(22) Filed: May 18, 2010

(65) Prior Publication Data

US 2011/0096564 A1    Apr. 28, 2011

(30) Foreign Application Priority Data

Oct. 28, 2009  (KR) ......................... 10-2009-0102994

(51) Int. Cl.
*F21V 7/04*    (2006.01)

(52) U.S. Cl.
USPC ........... 362/613; 362/607; 362/620; 362/330; 362/331; 349/65; 349/67

(58) Field of Classification Search .................. 362/611, 362/612, 613, 331, 620; 349/62, 65
See application file for complete search history.

(56) References Cited

U.S. PATENT DOCUMENTS

| | | | | |
|---|---|---|---|---|
| 7,101,070 | B2 * | 9/2006 | Yu et al. | 362/558 |
| 7,182,499 | B2 * | 2/2007 | Chen et al. | 362/621 |
| 7,220,041 | B2 * | 5/2007 | Chen et al. | 362/613 |
| 7,344,291 | B2 * | 3/2008 | Hatanaka et al. | 362/610 |
| 7,401,965 | B2 * | 7/2008 | Xu et al. | 362/621 |
| 7,422,358 | B2 * | 9/2008 | Weng et al. | 362/633 |
| 7,581,850 | B2 * | 9/2009 | Liao | 362/245 |
| 7,810,977 | B2 * | 10/2010 | Ueyama | 362/610 |
| 2008/0158477 | A1 * | 7/2008 | Hsiao | 349/65 |

FOREIGN PATENT DOCUMENTS

| KR | 1020040057383 | 7/2004 |
|---|---|---|
| KR | 1020060095412 | 8/2006 |
| KR | 1020070039383 | 4/2007 |
| KR | 1020070119119 | 12/2007 |

* cited by examiner

*Primary Examiner* — Ali Alavi
(74) *Attorney, Agent, or Firm* — Cantor Colburn LLP

(57) ABSTRACT

A display apparatus includes; a plurality of light sources which emit a light, a display panel which displaying an image using the light, a light guide plate which guides the light emitted from the light sources to the display panel, and a plurality of reflection members that are spaced apart from each other and coupled with a first side of the light guide plate and a second side of the light guide plate facing the first side to reflect light traveling inside the light guide plate to the first and second sides, wherein the plurality of light sources include; a plurality of first light sources, each of the plurality of first light sources being arranged corresponding to an area between two adjacent reflection members of the plurality of reflection members on the first side and a plurality of second light sources each being arranged corresponding to an area between two reflection members on the second side.

18 Claims, 7 Drawing Sheets

BACKLIGHT ASSEMBLY AND DISPLAY APPARATUS HAVING THE SAME

This application claims priority to Korean Patent Application No. 2009-102994, filed on Oct. 28, 2009, and all the benefits accruing therefrom under 35 U.S.C. §119, the content of which in its entirety is herein incorporated by reference.

BACKGROUND OF THE INVENTION

1. Field of the Invention

The present invention relates to a backlight assembly and a display apparatus having the backlight assembly. More particularly, the present invention relates to a backlight assembly capable of uniformly outputting a light therefrom and a display apparatus having the backlight assembly.

2. Description of the Related Art

In general, a display apparatus includes a backlight assembly for generating a light and a display panel receiving the light from the backlight assembly in order to display an image. In order to improve a display quality of the display apparatus, uniformly providing a light from the backlight assembly to an entire area of a display area in the display panel is advantageous.

BRIEF SUMMARY OF THE INVENTION

Exemplary embodiments of the present invention provide a backlight assembly capable of uniformly providing a light to a display panel.

Exemplary embodiments of the present invention provide a display apparatus including the backlight assembly to improve its display quality.

According to the exemplary embodiments, a backlight assembly includes; a light guide plate having a first side surface and a second side surface opposite to the first side surface, which guides a light incident from both the first side surface and the second side surface to an upper portion thereof, a plurality of first light sources emitting a light to the first side surface, a plurality of second light sources emitting a light to the second side surface, a first reflection member disposed between the plurality of first light sources and coupled with the first side surface to reflect the light incident from the second side surface, and a second reflection member disposed between the plurality of second light sources and coupled with the second side surface to reflect the light incident from the first side surface.

According to the exemplary embodiments, a backlight assembly includes; a light guide plate having a first side surface and a second side surface opposite to the first side surface and, which guides a light incident from both the first side surface and the second side surface to an upper portion thereof, a plurality of light out-coupling patterns arranged on a planar surface of the light guide plate to change a path of the light traveling the light guide plate, a plurality of light sources emitting a light to the first side surface and the second side surface, and a plurality of first areas located adjacent to the first side surface and the second side surface between the plurality of light sources from a plan view perspective, which having a greater density of the light out-coupling patterns.

According to the exemplary embodiments, a display apparatus includes; a display panel which displays an image, a light guide plate having a first side surface and a second side surface opposite to the first side surface, which guides a light incident from both the first side surface and the second side surface to the display panel, a plurality of first light sources emitting a light to the first side surface, a plurality of second light sources emitting a light to the second side surface, a first reflection member disposed between the plurality of first light sources and coupled with the first side surface to reflect the light incident from the second side surface, and a second reflection member disposed between the plurality of second light sources and coupled with the second side surface to reflect the light incident from the first side surface.

According to the exemplary embodiments, a display apparatus includes; a display panel which displays an image, a light guide plate having a first side surface and a second side surface opposite to the first side surface, which guides a light incident from both the first side surface and the second side surface to the display panel, a plurality of light out-coupling patterns arranged on a planar surface of the light guide plate to change a path of the light traveling the light guide plate toward the display panel, a plurality of light sources emitting a light to the first side surface and the second side surface, and a plurality of first areas located adjacent to the first side surface and the second side surface between the plurality of light sources from a plan view perspective, which having a greater density of the light out-coupling patterns.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
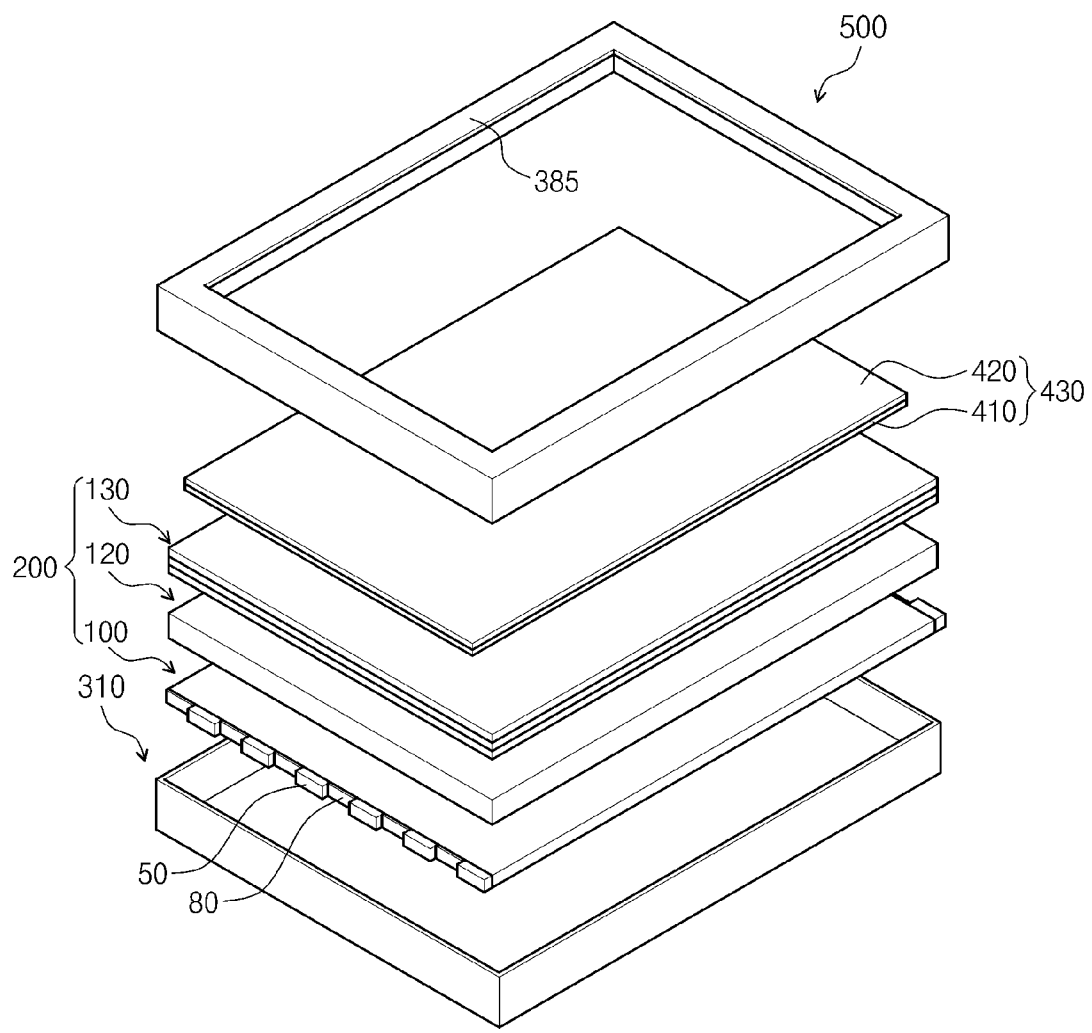
FIG. 1 is an exploded perspective view showing an exemplary embodiment of a display apparatus according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on another element, it can be directly on the other element or intervening elements may be present. In contrast, when an element is referred to as being "directly on" another element, there are no intervening elements present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

Figure 2:
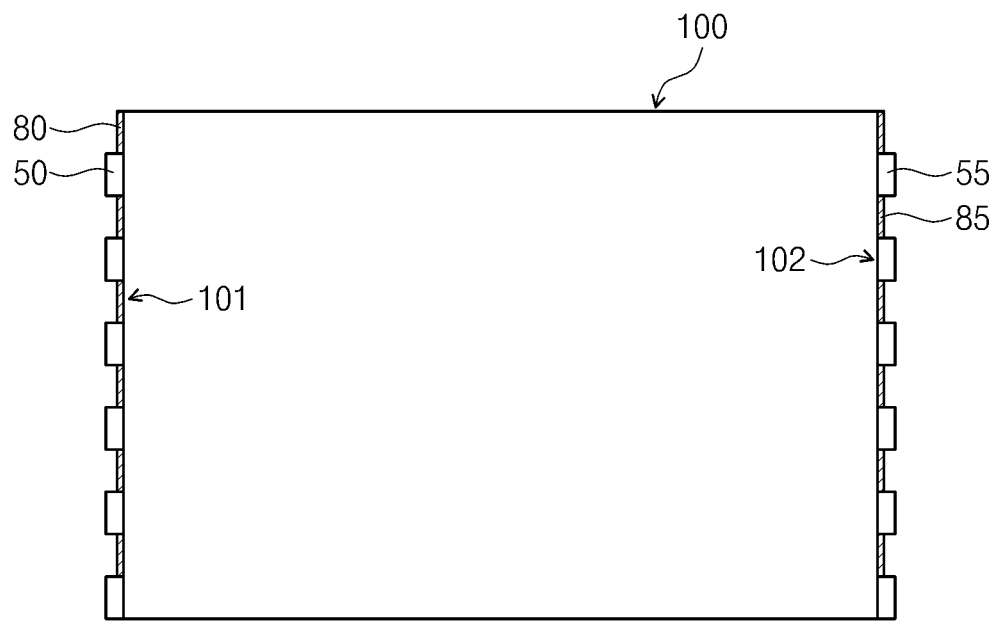
FIG. 2 is a plan view showing an exemplary embodiment of a light guide plate coupled with first light sources, second light sources, a first reflection member and a second reflection member of the exemplary embodiment of a display apparatus of FIG. 1.

FIG. 1 is an exploded perspective view showing an exemplary embodiment of a display apparatus according to the present invention, and FIG. 2 is a plan view showing first light sources, second light sources, and a light guide plate coupled with a first reflection member and a second reflection member of the exemplary embodiment of a display apparatus of FIG. 1.

Referring to FIGS. 1 and 2, a display apparatus 500 includes a backlight assembly 200, a display panel 430, a bottom chassis 310 and a top chassis 385. The backlight assembly 200 generates a light and the display panel 430 receives the light from the backlight assembly 200 to display an image. Also, in the present exemplary embodiment the bottom chassis 310 includes a bottom and side walls that are extended from the bottom to provide a containing space for the backlight assembly 200 and display panel 430, and the top chassis 385 is coupled with the bottom chassis 310 to partially cover the backlight assembly 200 and the display panel 430.

In the present exemplary embodiment, the backlight assembly 200 includes a light guide plate 100, first light sources 50, second light sources 55, first reflection members 80, second reflection members 85 and a diffusion plate 120. The present exemplary embodiment also includes optical films 130, although alternative exemplary embodiments may include configurations wherein they are omitted.

The light guide plate 100 has a plate-like, e.g., substantially planar, shape and includes a light-transmitting, exemplary embodiments of which include polymethylmethacrylate ("PMMA"), polycarbonate ("PC"), polystyrene ("PS") and other materials with similar characteristics. In addition, exemplary embodiments include configurations wherein the light guide plate 100 includes light out-coupling patterns 106 (shown in detail FIG. 4A) on a rear surface thereof to control a path of the light emitted from the first and second light sources 50 and 55. Thus, the light guide plate 100 may guide the light emitted from the first and second light sources 50 and 55 to the display panel 430 using the light out-coupling patterns.

The first light sources 50 are spaced apart from each other and coupled with a first side 101 of the light guide plate 100, and the light emitted from the first light sources 50 is provided to the light guide plate 100 through the first side 101. In addition, the second light sources 55 are spaced apart from each other and coupled with a second side 101 of the light guide plate 100 facing the first side 101, and the light emitted from the second light sources 55 is provided to the light guide plate 100 through the second side 102.

In the present exemplary embodiment, the first light sources 50 face the second light sources 55 in a one-to-one correspondence from a plan view perspective, and the first reflection members 80 face the second reflection members 85 in a one-to-one correspondence from a plan view perspective. Also, embodiments include configurations wherein the first and second light sources 50 and 55 may be a point light source, exemplary embodiments of which include a light emitting diode ("LED").

The diffusion plate 120 is arranged between the display panel 430 and the light guide plate 100. The diffusion plate 120 diffuses the light provided from the light guide plate 100 to the display panel 430. The optical films 130 are arranged between the diffusion plate 120 and the display panel 430, although, as mentioned above, the optical films 130 may be omitted. In the present exemplary embodiment, the optical films 130 may include a prism sheet condensing, e.g., collimating, the light exiting from the diffusion plate 120 to enhance a front brightness of the display apparatus 500 and diffusion films diffusing the light exiting from the diffusion plate 120.

In one exemplary embodiment, the display panel 430 includes a first substrate 410 on which a thin film transistor is formed, a second substrate 420 facing the first substrate 410 and a liquid crystal layer (not shown) disposed between the first substrate 410 and the second substrate 420 in an active-matrix display system. The first substrate 410 includes a plurality of pixels (not shown) each of which includes the thin film transistor (not shown) and a pixel electrode (not shown) electrically connected to the thin film transistor. In one exemplary embodiment, the second substrate 420 includes color filters (not shown) corresponding to the pixels in a one-to-one correspondence and a common electrode (not shown) forming an electric field with the pixel electrode. Alternative exemplary embodiments include configurations wherein the color filter is formed on the first substrate 410. Alternative exemplary embodiments may also include configurations wherein the display panel 430 is a passive-matrix display system.

As described above, although not shown in figures, the color filters may be formed on the first substrate 410, and the common electrode may be also formed on the first substrate 410, not on the second substrate 420. In the exemplary embodiment wherein the common electrode is formed on the first substrate 410, the common electrode may generate a horizontal electric field with the pixel electrode to serve as an opposite electrode to control a direction of liquid crystal molecules therebetween.

In the present exemplary embodiment, the first reflection members 80 are coupled with the first side 101 of the light guide plate 100 and each of the first reflection members 80 is positioned between two adjacent first light sources 50. In the present exemplary embodiment, the second reflection members 85 are coupled with the second side 102 of the light guide plate 100 and each of the second reflection members 85 is positioned between two adjacent second light sources 55.

The first reflection members 80 and the second reflection members 85 include a material that reflects the light, such as polyethylene terephthalate ("PET"), aluminum or other materials with similar characteristics. Therefore, the first reflection members 80 reflect the light emitted from the second light sources 55 provided to the first side 101 through the light guide plate 100 back to the inside of the light guide plate 100, and the second reflection members 85 reflect the light emitted from the first light sources 50 provided to the second side 102 through the light guide plate 100 back to the inside of the light guide plate 100.

In other words, the first reflection members 80 and the second reflection members 85 may reflect the light emitted from the second and first light sources 55 and 50, respectively, back to the inside of the light guide plate 100 and thereby prevent light from being leaked through the first and second sides 101 and 102. Thus, an amount of the light emitted from the first and second light sources 50 and 55 and used to display an image on the display panel 430 may be increased by the first and second reflection members 80 and 85. More detailed description of the above will be described with reference to FIG. 3.

Figure 3:
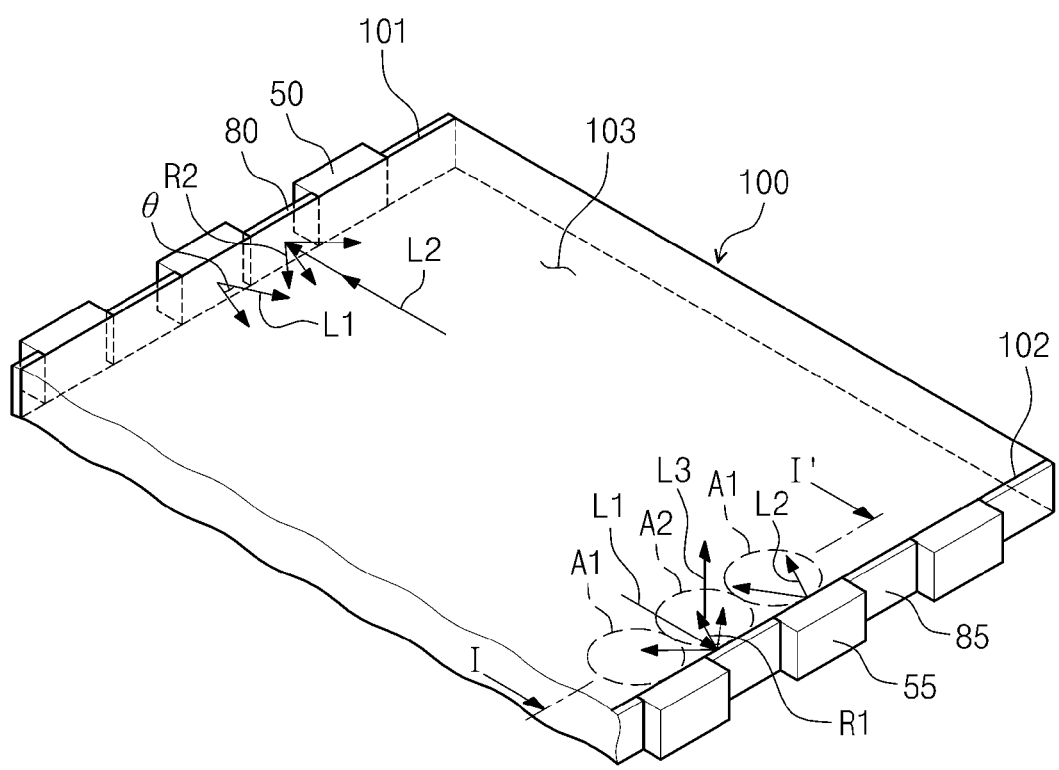
FIG. 3 is a perspective view showing a portion of the exemplary embodiment of a display apparatus of FIG. 2.
Figure 4A:
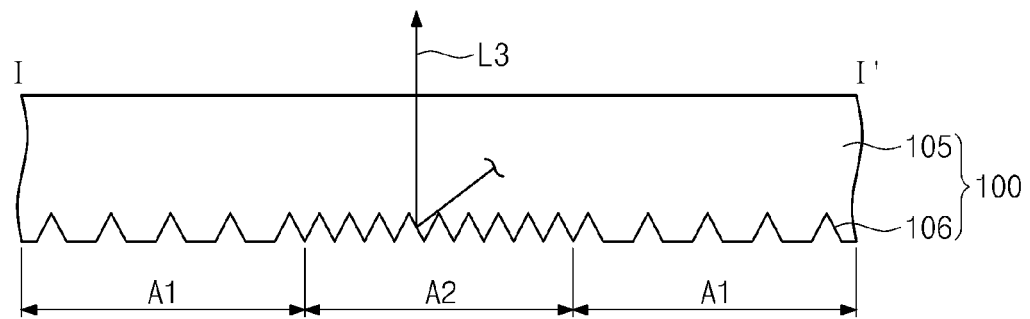
FIG. 4A is a cross-sectional view taken along line I-I' of FIG. 3.
Figure 4B:
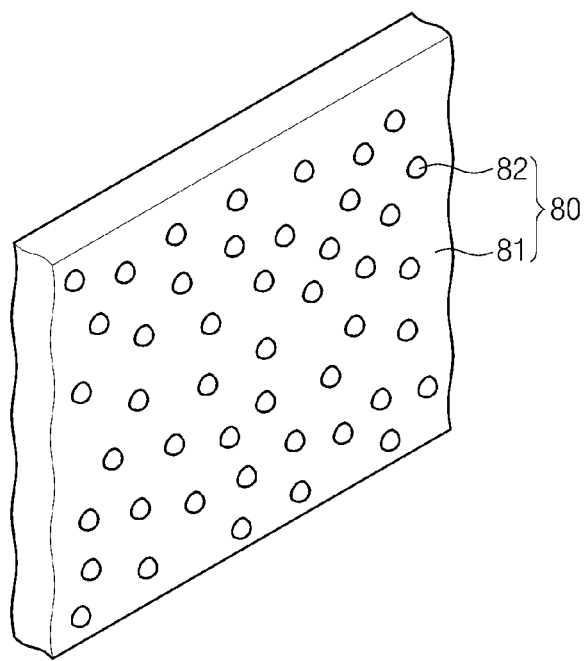
FIG. 4B is an enlarged view showing a portion of the exemplary embodiment of a reflection member of FIG. 3.

FIG. 3 is a perspective view showing a portion of the exemplary embodiment of a light guide plate 100 of FIG. 2, FIG. 4A is a cross-sectional view taken along line I-I' of FIG. 3, and FIG. 4B is an enlarged view showing a portion of the exemplary embodiment of a reflection member of FIG. 3.

Referring to FIGS. 3, 4A, and 4B, a first light L1 emitted from each of the first light sources 50 is provided to the inside of the light guide plate 100, and a second light L2 emitted from each of the second light sources 55 is provided to the inside of the light guide plate 100. As seen from a plan view perspective, an incident angle θ of the first light L1 or the second light L2 incident to the inside of the light guide plate 100 is about 85 degrees at maximum.

Most of the first light L1 has a path changed by the light out-coupling patterns 106 arranged on the rear, e.g., underside, surface of the light guide plate 100 and is provided to the display panel 430 (shown in FIG. 1) after exiting through an exit surface 103 of the light guide plate 100 substantially opposite to the rear surface of the light guide plate 100. However, a portion of the first light L1 that does not exit through the exit surface 103 travels to the second side 102.

The first light L1 that travels to the second side 102 is reflected by the second reflection members 85 arranged on the second side 102 to become a first reflection light R1, and the first reflection light R1 may be reflected by the light out-coupling patterns 106 to exit through the exit surface 103. That is, the second reflection members 85 may prevent the light that is emitted from the first light sources 50 and does not exit through the exit surface 103 from leaking through the second side 102, thereby increasing the total amount of the light exiting through the exit surface 103 due to the second reflection members 85.

Similar to the first light L1, most of the second light L2 emitted from the second light sources 55 exits through the exit surface 103 due to the light out-coupling patterns 106, however, the portion of the second light L2 that does not exit through the exit surface 103 travels to the first side 101.

The second light L2 traveling to the first side 101 is reflected by the first reflection members 80 to become a second reflection light R2, and the second reflection light R2 may be reflected by the light out-coupling patterns 106 to exit through the exit surface 103. That is, the first reflection members 80 may prevent the light that is emitted from the second light sources 55 and does not exit through the exit surface 103 from leaking through the first side 101, thereby increasing the total amount of the light exiting through the exit surface 103 due to the first reflection members 80.

As described above, the first reflection members 80 and the second reflection members 85 may increase the amount of the light provided to the display panel 430 (shown in FIG. 1) through the exit surface 103. More particularly, the first reflection members 80 and the second reflection members 85 may increase the amount of the light exiting from the exit surface 103 in an area that is adjacent to each of the first reflection members 80 and each of the second reflection members 85 from a plan view perspective.

For example, the light guide plate 100 includes a first area A1 and a second area A2, which are adjacent to the second side 102. The first area A1 is adjacent to each of the second light sources 55 from a plan view perspective and the second area A2 is adjacent to each of the second reflection members 85 from a plan view perspective. Since the first reflection light R1 is generated by the second reflection members 85, an amount of a third light L3 exiting through the exit surface 103 in the second area A2 may be increased due to the first reflection light R1. Thus, the second reflection members 85 may compensate for the amount of the light exiting from the exit surface 103 in the second area A2, which would otherwise be relatively smaller than the amount of the light exiting from the exit surface 103 in the first area A1.

FIG. 4A is a cross-sectional view taken along line I-I' of FIG. 3.

Referring to FIG. 4A, the light guide plate 100 includes a body 105 having a plate-like, e.g., planar, shape and the light out-coupling patterns 106 arranged at the rear surface of the body 105. In the present exemplary embodiment, the body 105 is partially removed, e.g., etched away, sanded, or otherwise processed, to have a triangular shape from a cross-sectional view perspective, to thereby define the light out-coupling patterns 106. As a result, the path of the light provided to hypotenuses of the triangular shape is changed to allow the light to travel to the upper portion of the light guide plate 100, e.g., the exit surface 103.

When a density of the light out-coupling patterns 106 is defined as the number of the light out-coupling patterns 106 per unit surface area, in one exemplary embodiment the density of the light out-coupling patterns 106 in the first area A1 is greater than the density of the light out-coupling patterns 106 in the second area A2. As the density of the light out-coupling patterns 106 becomes greater, the amount of the light guided to the upper portion of the light guide plate 100 by the light out-coupling patterns 106 may be increased. Therefore, the relatively smaller amount of the light exiting from the light guide plate 100 in the second area A2 than the amount of the light exiting from the light guide plate 100 in the first area A1 may be compensated for by increasing the density of the light out-coupling patterns 106 in the second area A2 more than the density of the light out-coupling patterns 106 in the first area A1.

Although not shown in the figures, in the present exemplary embodiment the density of the light out-coupling patterns 106 in first and second areas adjacent to the first side 101 of the light guide plate 100 is the same as the density of the light out-coupling patterns 106 in the first and second areas A1 and A2 adjacent to the second side 102 of the light guide plate 100. That is, the density of the light out-coupling patterns 106 is greater in the second area positioned between two adjacent first areas more than in the first area corresponding to each of the first light sources 50.

Meanwhile, in the present exemplary embodiment, the first reflection members 80 and the second reflection members 85 may include a diffusion member. For example, referring to FIG. 4B, in one exemplary embodiment the first reflection members 80 include a reflection part 81 reflecting the light and the diffusion part 82 arranged on a surface of the reflection part 81. As a result, the second reflection light R2 reflected by the first reflection members 80 may be diffused by the diffusion part 82.

Figure 5:
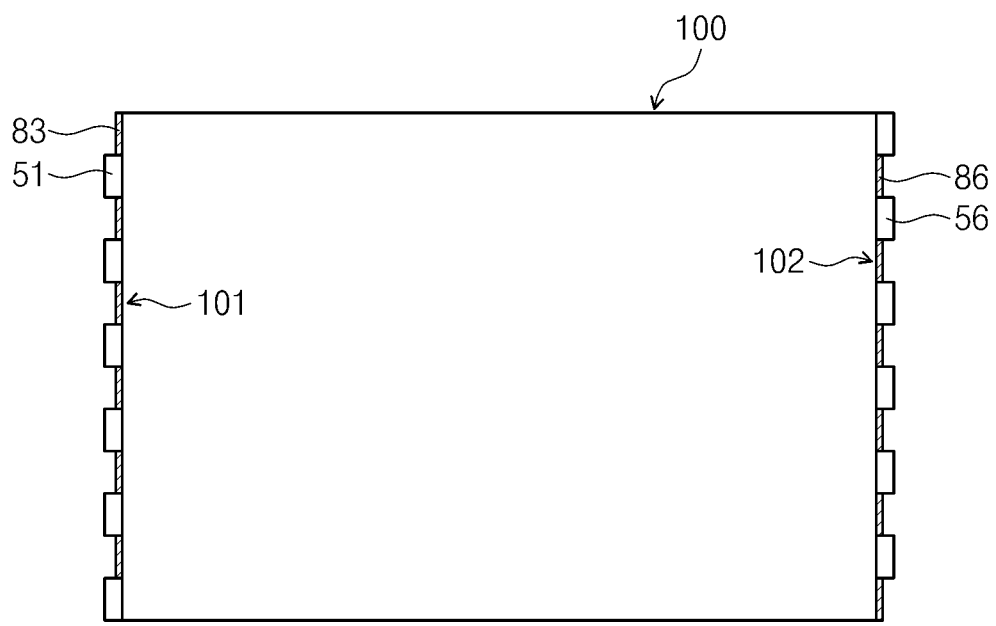
FIG. 5 is a plan view showing another exemplary embodiment of a light guide plate coupled with first light sources, second light sources, a first reflection member, and a second reflection member according to the present invention.
Figure 6:
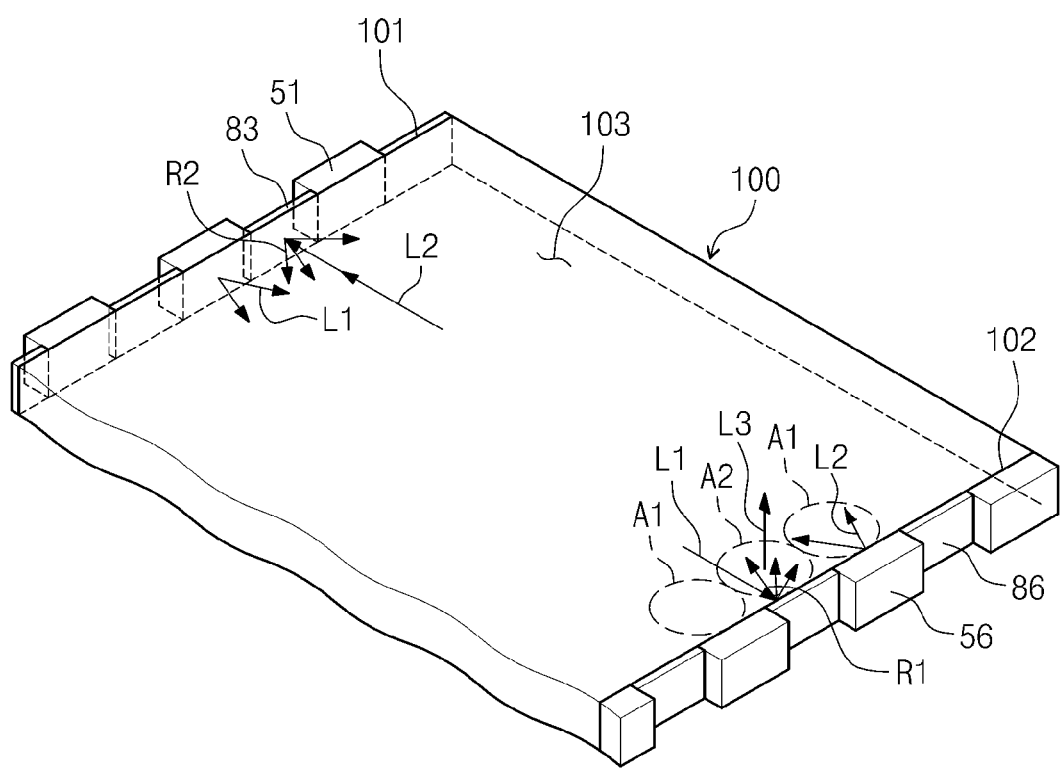
FIG. 6 is a perspective view showing a portion of the exemplary embodiment of a display apparatus of FIG. 5.

FIG. 5 is a plan view showing another exemplary embodiment of first light sources, second light sources, a light guide plate coupled with a first reflection member and a second reflection member according to the present invention, and FIG. 6 is a perspective view showing a portion of the exemplary embodiment of FIG. 5. In FIGS. 5 and 6, the same reference numerals denote the same elements in FIGS. 2 and 3, and thus the detailed descriptions of the same elements will be omitted.

Referring to FIGS. 5 and 6, first light sources 51 are spaced apart from each other and coupled with a first side 101 of a light guide plate 100, and a light emitted from the first light sources 51 is provided to the light guide plate 100 through the first side 101. Second light sources 56 are spaced apart from each other and coupled with a second side 102 facing the first side 101, and a light emitted from the second light sources 56 is provided to the light guide plate 100 through the second side 102, similar to the previous exemplary embodiment.

First reflection members 83 are coupled with the first side 101 of the light guide plate 100, and each of the first reflection members 83 is positioned between two adjacent first light sources 51 coupled with the first side 101. Second reflection members 86 are coupled with the second side 102 of the light guide plate 100, and each of the second reflection members 86 is positioned between two adjacent second light sources 56 coupled with the second side 102, similar to the previous exemplary embodiment.

However, unlike the previous exemplary embodiment, from a plan view perspective, the first light sources 51 face the second reflection members 86 in a one-to-one correspondence, and the second light sources 56 face the first reflection members 83 in a one-to-one correspondence. Thus, when an amount of the light exiting obliquely from a light emitting surface of the first and second light sources 51 and 56 is larger than an amount of the light exiting perpendicularly from the light emitting surface of the first and second light sources 51 and 56, an amount of a second reflection light R2 reflected by the first reflection members 83 and an amount of a first reflection light R1 reflected by the second reflection members 86 may be increased. Accordingly, as described earlier with reference to FIG. 3, the first and second reflection members 83 and 86 may compensate for the amount of the light exiting from an exit surface 103 of the light guide plate 100 in a second area A2 where no light source is immediately present, which is relatively smaller than the amount of the light exiting from the exit surface 103 in a first area A1 corresponding to the presences of the light source.

Meanwhile, in order to compensate for the relatively smaller amount of the light exiting through the exit surface 103 in the second area A2 than the amount of the light exiting through the exit surface 103 in the first area A1, as described earlier with reference to FIG. 4A, the light out-coupling patterns 106 (shown in FIG. 4A) may be formed to have a density greater in the second area A2 than in the first area A1.

Figure 7:
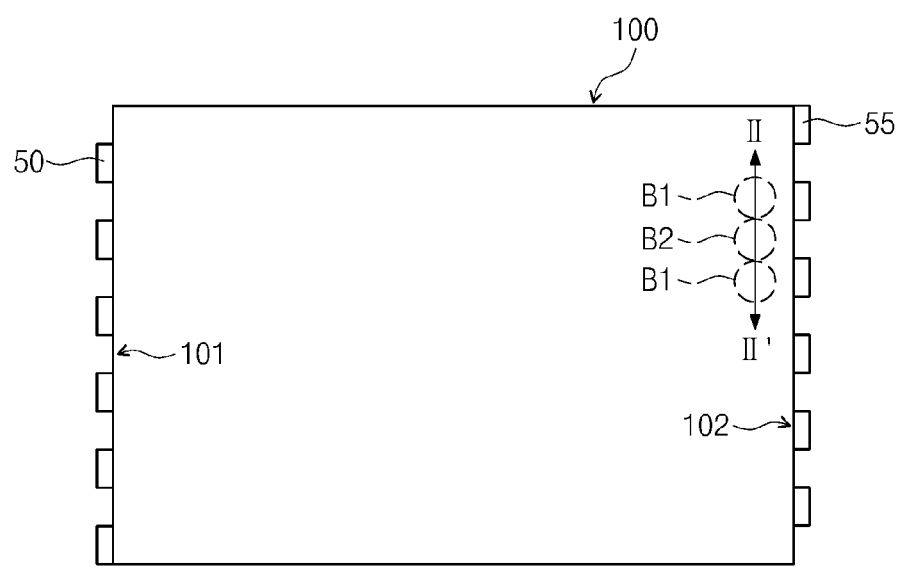
FIG. 7 is a plan view showing another exemplary embodiment of a light guide plate coupled with first light sources and second light sources according to another exemplary embodiment of the present invention.
Figure 8:
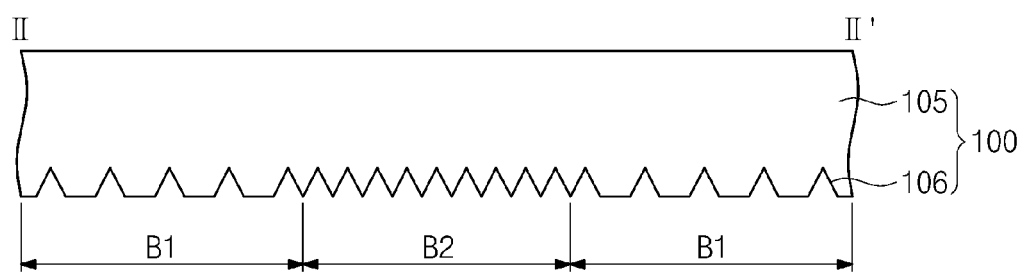
FIG. 8 is a cross-sectional view taken along line II-II' of FIG. 7.

FIG. 7 is a plan view showing another exemplary embodiment of a light guide plate coupled with first light sources and second light sources according to the present invention, and FIG. 8 is a cross-sectional view taken along line II-IF of FIG. 7. In FIGS. 7 and 8, the same reference numerals denote the same elements in FIGS. 1 to 4, and thus the detailed descriptions of the same elements will be omitted.

Referring to FIGS. 7 and 8, first light sources 50 that are spaced apart from each other are arranged on a first side 101 of a light guide plate 100. Second light sources 55 that are spaced apart from each other are arranged on a second side 102 facing the first side 101. Each of the second light sources 55 is positioned corresponding to an area between two adjacent first light sources 50, similar to the previous exemplary embodiment. However, in the present exemplary embodiment the first and second reflection members may be omitted.

The light guide plate 100 includes a first area B1 and a second area B2, which are adjacent to the second side 102. From a plan view perspective, the first area B1 is adjacent to each of the second light sources 55 and the second area B2 is positioned between two adjacent first areas B1.

Light out-coupling patterns 106 are arranged on a rear surface of the light guide plate 100. If a density of the light out-coupling patterns 106 is defined as the number of the light out-coupling patterns 106 per unit area, as above, the density of the light out-coupling patterns 106 is greater in the second area B2 than in the first area B1. As the density of the light out-coupling patterns 106 increases, an amount of the light guided to an upper portion of the light guide plate 100 increases, thereby compensating for a relatively smaller amount of the light exiting from the light guide plate 100 in the second area B2 than an amount of the light exiting from the light guide plate 100 in the first area B1.

Although not shown in figures, when assuming that the light guide plate 100 includes a first area corresponding to each of the first light sources 50 and a second area positioned between two adjacent first light sources 50, the density of the light out-coupling patterns 106 in first and second areas adjacent to the first side 101 of the light guide plate 100 is the same as the density of the light out-coupling patterns 106 in the first and second areas A1 and A2 adjacent to the second side 102 of the light guide plate 100. That is, the density of the light out-coupling patterns 106 is greater in the second area positioned between two adjacent first areas than in the first area corresponding to each of the second light sources 55.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
   a display panel which displays an image;
   a light guide plate having a first side surface and a second side surface opposite to the first side surface, which guides a light incident from both the first side surface and the second side surface to the display panel;
   a plurality of first light sources emitting a light to the first side surface;
   a plurality of second light sources emitting a light to the second side surface;
   a first reflection member disposed between the plurality of first light sources and coupled directly with the first side surface to reflect the light incident from the second side surface; and
   a second reflection member disposed between the plurality of second light sources and directly coupled with the second side surface to reflect the light incident from the first side surface.

2. The display apparatus of claim 1, wherein the plurality of first light sources face the plurality of second light sources in a one-to-one correspondence, and the first reflection member faces the second reflection member.

3. The display apparatus of claim 2, wherein the light guide plate comprises:
   a plurality of light out-coupling patterns arranged on a planar surface of the light guide plate to change a path of the light traveling the light guide plate toward the display panel; and
   a first area adjacent to the first reflection member and to the second reflection member from a plan view perspective, which having a greater density of the light out-coupling patterns.

4. The display apparatus of claim 3, further comprising a plurality of diffusion members disposed between the light guide plate and the first and the second reflection members.

5. The display apparatus of claim 1, wherein the first reflection member faces at least one of the second light sources and the second reflection member faces at least one of the first light sources.

6. The display apparatus of claim 5, wherein the light guide plate comprises:
   a plurality of light out-coupling patterns arranged on a planar surface of the light guide plate to change a path of the light traveling the light guide plate toward the display panel; and
   a first area adjacent to the first reflection member and to the second reflection member from a plan view perspective, which having a greater density of the light out-coupling patterns.

7. The display apparatus of claim 6, further comprising a plurality of diffusion members disposed between the light guide plate and the first and the second reflection members.

8. The display apparatus of claim 1, wherein the plurality of first light sources and the second light sources are light emitting diodes.

9. A display apparatus comprising:
   a display panel which displays an image;
   a light guide plate having a first side surface and a second side surface opposite to the first side surface and, which guides a light incident from both the first side surface and the second side surface to the display panel;
   a plurality of light out-coupling patterns arranged on a planar surface of the light guide plate to change a path of the light traveling the light guide plate toward the display panel;
   a plurality of light sources emitting a light to the first side surface and the second side surface; and
   a plurality of first areas located adjacent to the first side surface and the second side surface between the plurality of light sources from a plan view perspective, which have a greater density of the light out-coupling patterns compared to areas aligned with the plurality of light sources from the plan view perspective.

10. A backlight assembly comprising:
    a light guide plate having a first side surface and a second side surface opposite to the first side surface, which guides a light incident from both the first side surface and the second side surface to an upper portion thereof;
    a plurality of first light sources emitting a light to the first side surface;
    a plurality of second light sources emitting a light to the second side surface;
    a first reflection member disposed between the plurality of first light sources and coupled directly with the first side surface to reflect the light incident from the second side surface; and
    a second reflection member disposed between the plurality of second light sources and coupled directly with the second side surface to reflect the light incident from the first side surface.

11. The backlight assembly of claim 10, wherein the plurality of first light sources face the plurality of second light sources in a one-to-one correspondence, and the first reflection member faces the second reflection member.

12. The backlight assembly of claim 11, wherein the light guide plate comprises:
    a plurality of light out-coupling patterns arranged on a planar surface of the light guide plate to change a path of light traveling the light guide plate; and
    a first area adjacent to the first reflection member and to the second reflection member from a plan view perspective, which having a greater density of the light out-coupling patterns.

13. The backlight assembly of claim 12, further comprising a plurality of diffusion members disposed between the light guide plate and the first and the second reflection members.

14. The backlight assembly of claim 10, wherein the first reflection member faces at least one of the second light sources and the second reflection member faces at least one of the first light sources.

15. The backlight assembly of claim 14, wherein the light guide plate comprises:
    a plurality of light out-coupling patterns arranged on a planar surface of the light guide plate to change a path of the light traveling the light guide plate toward the display panel; and
    a first area adjacent to the first reflection member and to the second reflection member from a plan view perspective, which having a greater density of the light out-coupling patterns.

16. The backlight assembly of claim 15, further comprising a plurality of diffusion members disposed between the light guide plate and the first and the second reflection members.

17. The backlight assembly of claim 10, wherein the plurality of first light sources and the second light sources are light emitting diodes.

18. A backlight assembly comprising:
- a light guide plate having a first side surface and a second side surface opposite to the first side surface, which guides a light incident from both the first side surface and the second side surface to an upper portion thereof;
- a plurality of light out-coupling patterns arranged on a planar surface of the light guide plate to change a path of the light traveling the light guide plate;
- a plurality of light sources emitting a light to the first side surface and the second side surface; and
- a plurality of first areas located adjacent to the first side surface and the second side surface between the plurality of light sources from a plan view perspective, which have a greater density of the light out-coupling patterns compared to areas aligned with the plurality of light sources from the plan view perspective.

* * * * *